UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

PROCESS OF MAKING INCANDESCENTS.

SPECIFICATION forming part of Letters Patent No. 306,980, dated October 21, 1884.

Application filed May 27, 1881. (No specimens.)

*To all whom it may concern:*

Be it known that I, EDWARD WESTON, of Newark, in the county of Essex and State of New Jersey, have invented certain new and useful Improvements in the Process of Manufacturing Carbon Conductors for Incandescent Electric Lamps, of which the following is a specification.

Carbon conductors designed for the production of light by electrical incandescence should possess the qualities of relatively high resistance, perfect homogeneity, and great density. It is equally essential with the presence of these qualities that they should be the same throughout the whole extent of the conductors; otherwise the carbon is unevenly heated and very soon destroyed. Carbon which is obtained from gas-retorts, or in its allotropic condition—as graphite—rarely, if ever, is found in such perfect condition as to make it practically serviceable for incandescent lighting. Even those conductors composed of a composition of powdered carbon and an adhesive substance consolidated by pressure and carbonized in a furnace are capable of withstanding only imperfectly the intense heat of electrical incandescence, for their porous nature, under even the most favorable conditions and in an atmosphere which is an absolute non-supporter of combustion, gives rise to a mechanical action resulting in a wearing away or transfer of their particles; furthermore, the excessively high temperature necessary for complete carbonization can never be attained in the furnace or oven in which the composite carbons are prepared. To remedy the defects due to the above-described causes, and to produce an efficient and durable conductor from carbon in its native or porous state, forms the object of my present invention.

My invention depends upon the well-known fact that when an infusible or refractory substance is raised to a high temperature in an enveloping gas or fluid containing carbon in its composition the particles of carbon are dissociated therefrom and deposited on the heated surface. This phenomenon is exemplified in the carbonaceous deposits in gas-retorts, and has been incidentally noted as occurring during the course of various experiments involving the same or similar conditions.

In carrying out my invention I take advantage of this tendency of dissociation and deposition of carbon particles on heated bodies to build up the conductors for electric lamps, to reduce and equalize their electrical resistance, and to render them more capable of withstanding the intense heat of incandescence, and for this purpose I heat them by an electric current while immersed in a fluid or surrounded by a gas from which carbon is deposited. As the deposition progresses the resistance of the carbon is reduced, and a correspondingly greater amount of current required to maintain the requisite temperature. The process is then continued until the carbon is solidified and built up, and all portions rendered homogeneous and dense.

A convenient method of treating the carbon conductors is as follows: The ends of a strip or pencil of carbon of any kind whatsoever are attached to metal conductors and introduced into an inverted bell-glass containing liquid hydrocarbon, and set in an ordinary collecting-trough partially filled with the same liquid. The carbon being then raised to a low red heat by a strong electric current, the fluid in contact with the heated carbon is rapidly volatilized, the vapor rising to the upper part of the jar and causing the level of the liquid to fall. From the envelope of gas formed about the conductor carbon is separated in the form of a light steel-gray deposit, which penetrates the pores of the conductor and attaches itself to its exterior surface, the deposition being the most rapid at those points where the conductor, owing to inequalities in resistance offered, is the most heated by the current. In this way the carbon strip is gradually built up, its resistance lowered and evened up, and its capabilities for withstanding the heat of incandescence when inserted in a lamp correspondingly increased. The deposition may be continued until all portions of the carbon have been solidified and covered by the deposit; nor does it cease when, by reason of the decomposition, the gas has driven the liquid below the heated conductor, for the latter, being still surrounded by gas containing carbon, will continue to receive a deposit therefrom. When the conductor has been treated in this way for the length of time desired, it is replaced by others, which undergo a similar treatment, either while immersed in the oil or while simply surrounded by the carbon-bearing gas. When prepared, they are inserted in transparent receivers, which are exhausted and sealed or filled with a gas which is a non-supporter of combustion.

Carbons thus treated are nearly homogeneous throughout their whole extent, for as the deposition is the most rapid at those points where the heat is the greatest the weak portions, or those which offer the greatest resistance to the current, are built up even with the remainder of the strip. Although a specific method of carrying out the invention has been described, it is not my intention to limit myself to the same, as it is obvious that the desired results may be equally well attained by a variety of other means; for example, the carbon may be simply immersed below the level of a suitable fluid contained in an open receptacle, or it may be treated in a closed receiver of any kind containing a carbonaceous gas. Nor is the ultimate aim of my invention affected by the substances employed in the treatment of the carbons, except that they must contain carbon as one of the constituent elements. Such bodies are naphtha, olive or other oils, gasoline vapor, olefiant gas, or any hydrocarbon liquid or vapor.

Having thus described my invention, what I claim as new, and desire to secure by Letters Patent, is—

The improvement in the art of making carbon conductors for incandescent lamps, which consists in first forming a carbon core or base, and then building up said core with carbon obtained and deposited upon the same by and during the operation of electrically heating said core while surrounded by or saturated with a carbonaceous substance, substantially as hereinbefore set forth.

In testimony whereof I have hereunto affixed my signature.

EDWARD WESTON.

Witnesses:
 HENRY A. BECKMEYER.
 J. A. CROCKETT.